US 8,842,195 B2

(12) United States Patent
Katagawa et al.

(10) Patent No.: US 8,842,195 B2
(45) Date of Patent: Sep. 23, 2014

(54) IMAGE PICKUP APPARATUS HAVING IMAGE PICKUP ELEMENT THAT INCLUDES PIXELS USED AS BOTH FOCUS DETECTION PIXELS AND IMAGE PICKUP PIXELS (75) Inventors: Hiroyasu Katagawa, Tokyo (JP); Takeshi Ogawa, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 237 days.

(21) Appl. No.: 13/314,794

(22) Filed: Dec. 8, 2011

(65) Prior Publication Data
US 2012/0162466 A1  Jun. 28, 2012

(30) Foreign Application Priority Data

Dec. 22, 2010   (JP) ................................. 2010-285388

(51) Int. Cl.
*H04N 9/73* (2006.01)

(52) U.S. Cl.
USPC ....................................... 348/226.1; 348/353

(58) Field of Classification Search
CPC  H04N 5/23229; H04N 5/2357; H04N 5/2356
USPC .................... 348/222.1, 226.1, 345, 353, 354
See application file for complete search history.

(56) References Cited

U.S. PATENT DOCUMENTS

| 2010/0128138 A1* | 5/2010 | Nitta et al. ................. 348/222.1 |
| 2012/0026358 A1* | 2/2012 | Hirose ........................ 348/226.1 |
| 2012/0200735 A1* | 8/2012 | Katagawa et al. ......... 348/226.1 |

FOREIGN PATENT DOCUMENTS

| JP | 2000-292686 |   | 10/2000 |
| JP | 2007-282108 |   | 10/2007 |
| JP | 2009-017213 |   | 1/2009 |
| JP | 2009-038666 |   | 2/2009 |
| JP | 2009-081684 |   | 4/2009 |
| JP | 2010-263568 | A | 11/2010 |

* cited by examiner

*Primary Examiner* — Tuan Ho
(74) *Attorney, Agent, or Firm* — Cowan, Liebowitz & Latman, P.C.

(57) ABSTRACT

An image pickup apparatus 100 includes an image pickup element 101 that includes a plurality of pixels that function as both imaging pixels and focus detection pixels, which is configured so that an image pickup signal that is obtained by performing photoelectric conversion in a first direction, an evaluation value generating unit 107 that generates an evaluation value of the image pickup signal, a flicker detecting unit 108 that detects variation information of illumination intensity based on the evaluation value, a flicker correction value generating unit 109 that generates a flicker correction value for performing a flicker correction for the image pickup signal based on the variation information, a multiplier 105 that performs the flicker correction for the image pickup signal based on the flicker correction value, and a vertical correlation calculating unit 114 that performs a correlation calculation in the first direction after the flicker correction is performed.

6 Claims, 6 Drawing Sheets

IMAGE PICKUP APPARATUS HAVING IMAGE PICKUP ELEMENT THAT INCLUDES PIXELS USED AS BOTH FOCUS DETECTION PIXELS AND IMAGE PICKUP PIXELS

BACKGROUND OF THE INVENTION

1. Field of the Invention

The present invention relates to an image pickup apparatus having an image pickup element that includes pixels used as both focus detection pixels and image pickup pixels.

2. Description of the Related Art

Recently, an image pickup apparatus such as a digital still camera or a digital video camera that includes an image pickup element such as a CCD image sensor or a CMOS image sensor is widely used. When an object is taken as a moving image under a fluorescent light illumination, a phenomenon of a so-called flicker of the fluorescent light occurs. In other words, when an image is taken by using the image pickup element having rolling shutter characteristics under the illumination of the fluorescent light that is directly turned on by a commercial alternating-current power supply, a flicker of luminance, a so-called flicker of the fluorescent light, is generated in a time direction for each image.

Japanese Patent Laid-Open No. 2009-17213 discloses a method of integrating an output of the CMOS image sensor in a horizontal direction to obtain a vertical intensity distribution to calculate a flicker component in a vertical direction of a current frame based on the vertical intensity distribution of a plurality of frames. In Japanese Patent Laid-Open No. 2009-17213, an original image (an uncorrected shot image) is corrected by calculating a correction gain value based on the calculated flicker component and multiplying a correction coefficient by a video signal of the current frame.

Japanese Patent Laid-Open No. 2000-292686 discloses a method of dividing a light receiving unit of a part of pixels of an image pickup element into two to provide a pupil division function and then arranging focus detection pixels between imaging pixels at predetermined intervals to perform focus detection using a phase difference method. Japanese Patent Laid-Open No. 2007-282108 discloses not only a configuration in which a part of the image pickup areas of the image pickup element is used as focus detection pixels, but also a configuration in which an image pickup signal is generated by adding the focus detection pixels. Japanese Patent Laid-Open No. 2009-38666 discloses a method of correcting fluorescent light. Japanese Patent Laid-Open No. 2009-81684 discloses a method of performing the smoothing in order to reduce an influence by a motion of an object to suppress the influence of the motion of the object and generating a sine wave to be a correction gain of the flicker.

When the image pickup element that includes pixels that have functions as a focus detection pixel and an imaging pixel is used, the flicker of the fluorescent light also influences the focus detection pixel. Since the flicker of the fluorescent light generates luminous unevenness in a vertical direction, the bright and dark area also appears in two line images obtained by pupil division performed by collecting only signals from the focus detection pixels for which the pupil division have been performed up and down (A+B image, and C+D image), and therefore an image shift, i.e. a defocus amount, cannot be calculated precisely.

In Japanese Patent Laid-Open No. 2009-38666, an incorrect flicker correction gain value is calculated in correcting the flicker of the fluorescent light if a flicker component contains a variation component other than the flicker component such as the motion of the object. In Japanese Patent Laid-Open No. 2009-81684, a sine wave is generated to be a correction gain of the flicker, but a rest of correction or a excessive correction occurs since light emitting characteristics of the fluorescent light are distorted by rectification characteristics of the alternating-current power supply, a deterioration of a fluorescent material, or the like. Such a phenomenon may also be generated when the flicker detection or the flicker correction is performed after the pupil division.

SUMMARY OF THE INVENTION

The present invention provides an image pickup apparatus capable of performing a flicker correction with high accuracy.

An image pickup apparatus as one aspect of the present invention includes an image pickup element that includes a plurality of pixels that function as both a plurality of imaging pixels that perform photoelectric conversion of an image formed by a light beam from an image pickup optical system and a plurality of focus detection pixels that perform the photoelectric conversion of an image formed by a light beam that is obtained by performing a pupil division of the light beam from the image pickup optical system, which is configured so that an image pickup signal that is obtained by performing photoelectric conversion in a first direction, an evaluation value generating unit configured to generate an evaluation value of the image pickup signal, a flicker detecting unit configured to detect variation information of illumination intensity based on the evaluation value, a flicker correction value generating unit configured to generate a flicker correction value for performing a flicker correction for the image pickup signal based on the variation information of the illumination intensity, a flicker correcting unit configured to perform the flicker correction for the image pickup signal based on the flicker correction value, and a correlation calculating unit configured to perform a correlation calculation in the first direction after the flicker correction is performed.

An image pickup apparatus as another aspect of the present invention includes an image pickup element that includes a plurality of pixels that function as both a plurality of imaging pixels that perform photoelectric conversion of an image formed by a light beam from an image pickup optical system and a plurality of focus detection pixels that perform the photoelectric conversion of an image formed by a light beam that is obtained by performing a pupil division of the light beam from the image pickup optical system, which is configured so that an image pickup signal that is obtained by performing the photoelectric conversion in a first direction, a correlation calculating unit configured to perform a correlation calculation in the first direction, a flicker detecting unit configured to detect variation information of illumination intensity based on a result of the correlation calculation, a flicker correction value generating unit configured to generate a flicker correction value for performing a flicker correction for the image pickup signal based on the variation information of the illumination intensity, and a flicker correcting unit configured to perform the flicker correction for the image pickup signal based on the flicker correction value.

Further features and aspects of the present invention will become apparent from the following description of exemplary embodiments with reference to the attached drawings.

DESCRIPTION OF THE PREFERRED EMBODIMENTS

Exemplary embodiments of the present invention will be described below with reference to the accompanied drawings. In each of the drawings, the same elements will be denoted by the same reference numerals and the duplicate descriptions thereof will be omitted.

Figure 1:
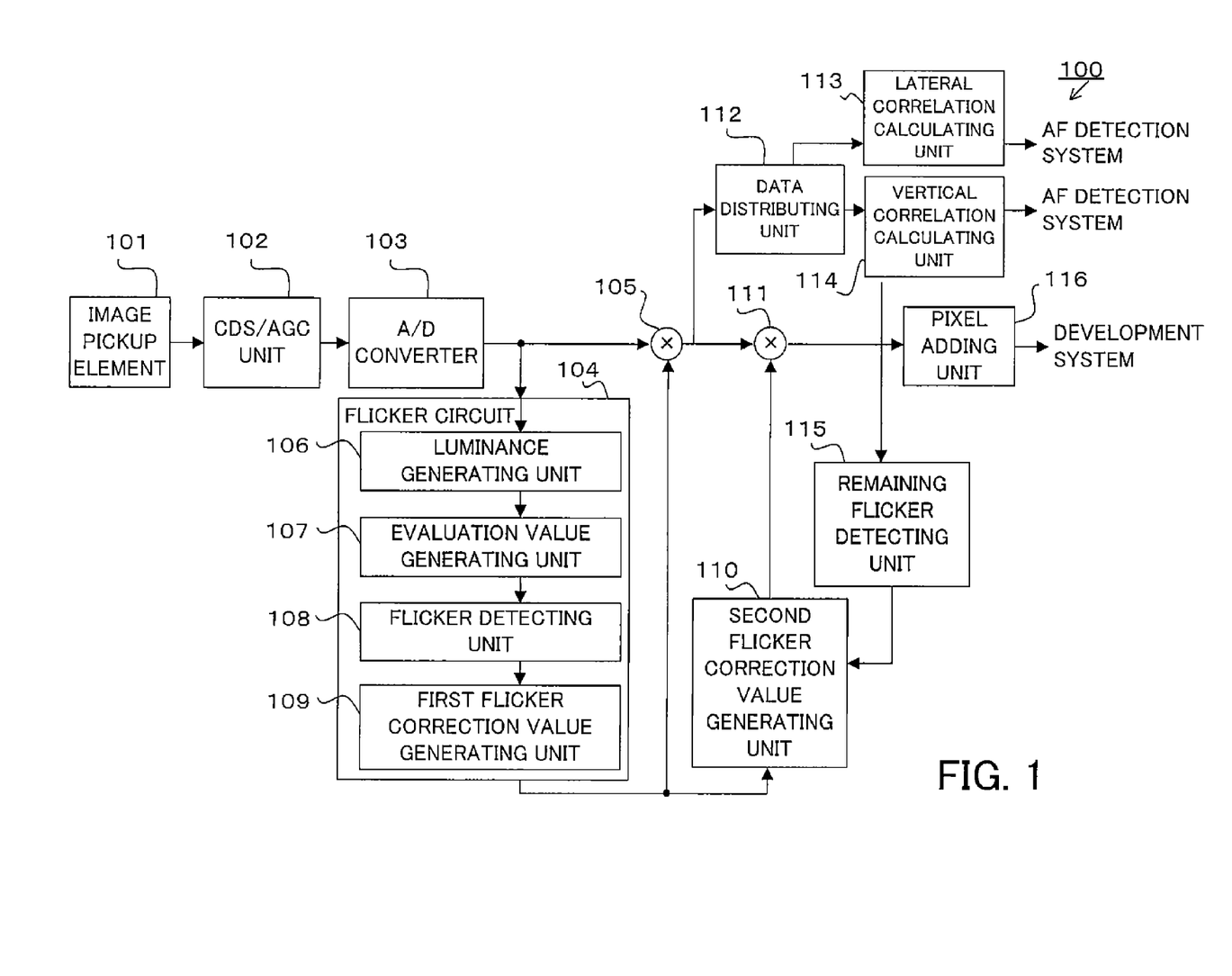
FIG. 1 is a block diagram of an image pickup apparatus in the present embodiment.

First of all, referring to FIG. 1, a configuration of an image pickup apparatus in the embodiment of the present invention will be described. FIG. 1 is a block diagram of an image pickup apparatus 100 in the present embodiment. An image pickup element 101 converts optical information into an electric signal (an image pickup signal) by performing a photoelectric conversion to be outputted during taking an image of an object. The image pickup element 101 includes a plurality of pixels that have functions as a plurality of imaging pixels that perform the photoelectric conversion of an image formed by a light beam from an image pickup optical system (not shown) and as a plurality of focus detection pixels that perform the photoelectric conversion of an image formed by a light beam that is obtained by a pupil division of the light beam from the image pickup optical system. The image pickup element 101 is also configured so that the image pickup signal that is obtained by performing the photoelectric conversion in a predetermined first direction is read out. A CDS/AGC unit 102 (Correlated Double Sampling and Auto Gain Control unit) is a processor that improves an S/N ratio of an analog electric signal. An A/D converter 103 converts the image pickup signal as an analog signal to an image pickup signal as a digital image signal. A flicker circuit 104 calculates a correction gain of a flicker using the converted digital image signal.

Figure 4:
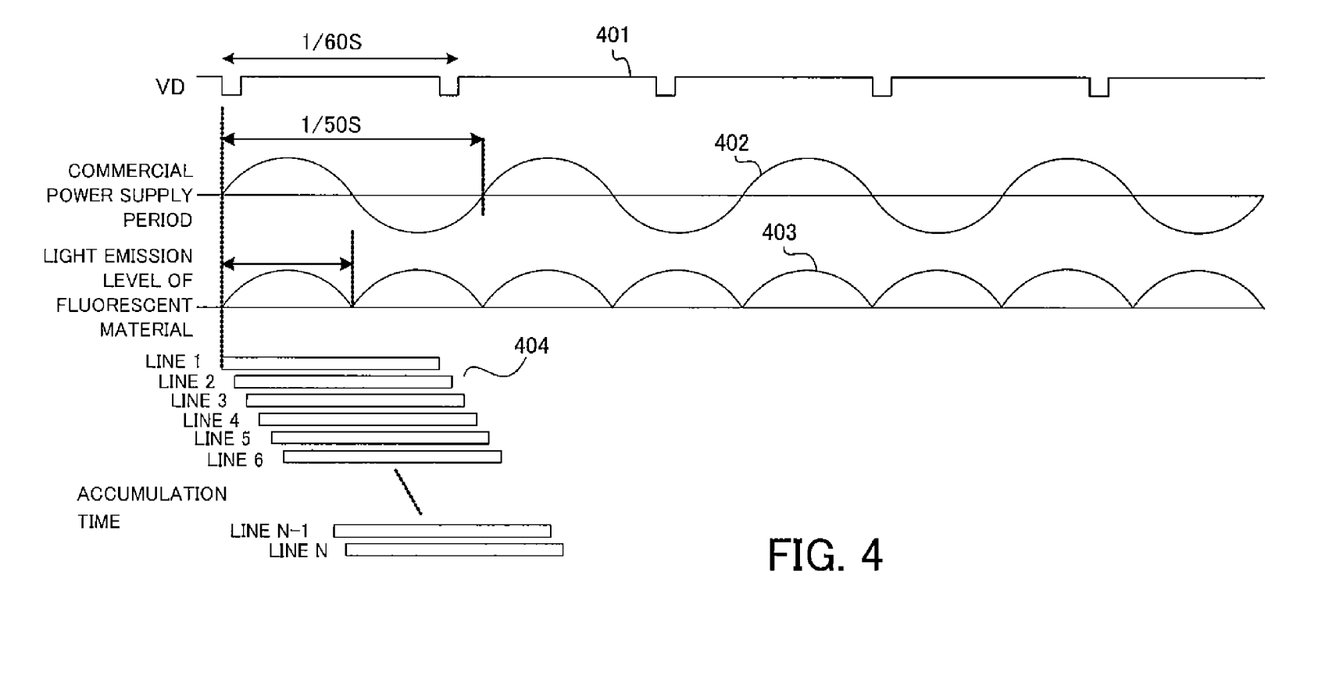
FIG. 4 is a diagram of describing a generation principle of a flicker of a fluorescent light in the present embodiment.

Subsequently, referring to FIG. 4, a principle of the generation of a flicker of fluorescent light will be described. FIG. 4 schematically illustrates a situation of charge accumulation in the image pickup element when the object is shot as a moving image by the image pickup apparatus using a CMOS image sensor under illuminating the fluorescent light in a region where a frequency of a commercial alternating-current power supply is 50 Hz. Reference numeral 401 denotes a vertical synchronous signal VD that is determined by an image pickup mode of the image pickup apparatus, and reference numeral 402 denotes a commercial power supply period (1/50 (s) in the embodiment). Reference numeral 403 denotes a light emitting period of a light emitting device that performs a fluorescence emission of light in accordance with the commercial power supply period 402. In the embodiment, the accumulation time of an electric charge on the CMOS image sensor has a period of 1/60 (s) that is the same as the period of the vertical synchronous signal VD in accordance with the period of the vertical synchronous signal VD.

Reference numeral 404 denotes a charge accumulation time of each line in the CMOS image sensor (exposure timing). Thus, the exposure timings of the lines (1 to N lines) are sequentially controlled. Since the light emitting period of the fluorescent material in the charge accumulation time 404 is different, the accumulated charge amount for a first line is different from the accumulated charge amount for a second line when shooting a single color plane. Thus, since an amount of the accumulated charges that are received during the charge accumulation time is different in each line even when it is in the same frame, the flicker of fluorescent light is generated.

As illustrated in FIG. 1, the flicker circuit 104 is configured by including a luminance generating unit 106, an evaluation value generating unit 107, a flicker detecting unit 108, and a flicker correction value generating unit 109. The flicker circuit 104 is a circuit that generates a luminance Y based on R, G, and B pixels to remove the flicker using the luminance Y. First of all, the luminance generating unit 106 of the flicker circuit 104 generates the luminance Y based on the R, G, and B pixels. For example, an expression of calculating the luminance Y is represented as following Expression (1).

$$Y \approx 0.299R + 0.587G + 0.114B \tag{1}$$

The luminance generating unit 106 generates the luminance Y using Expression (1) described above, and outputs the generated luminance Y to the evaluation value generating unit 107. The evaluation value generating unit 107 generates an evaluation value of the image pickup signal (data to be used for detection) based on the luminance Y that is inputted from the luminance generating unit 106.

Figure 7:
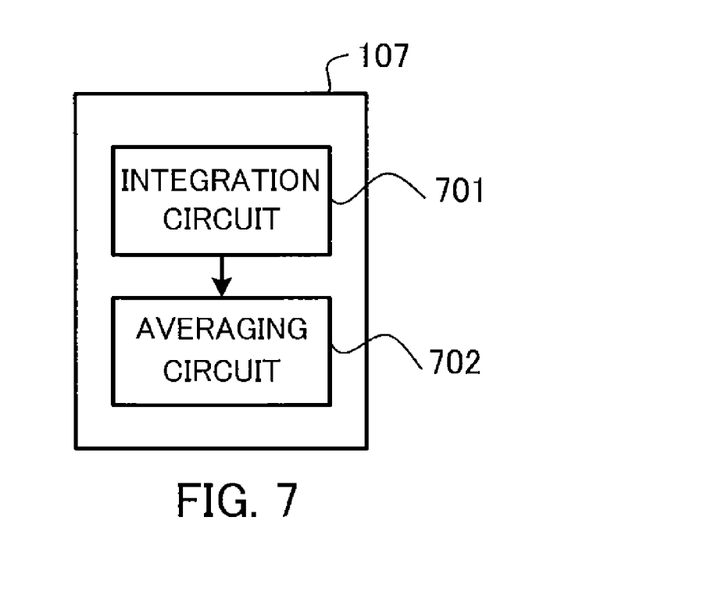
FIG. 7 is a block diagram of an evaluation value generating unit in the present embodiment.

Subsequently, referring to FIG. 7, a circuit configuration of the evaluation value generating unit 107 will be described. FIG. 7 is a block diagram of the evaluation value generating unit 107. Reference numeral 701 denotes an integration circuit that divides an area into a plurality of areas in a vertical direction and a horizontal direction to perform integration in each area. A result obtained by the integration by the integration circuit 701, i.e. an integrated value, is inputted to an averaging circuit 702 (a normalizing circuit). The averaging circuit 702 averages (normalizes) the integrated values obtained by the integration circuit 701, and outputs the result, i.e. average value, to the flicker detecting unit 108. The flicker detecting unit 108 detects variation information (the flicker) of the illumination intensity based on the evaluation value (the level of the image pickup signal) that is obtained by the evaluation value generating unit 107.

Figure 8:
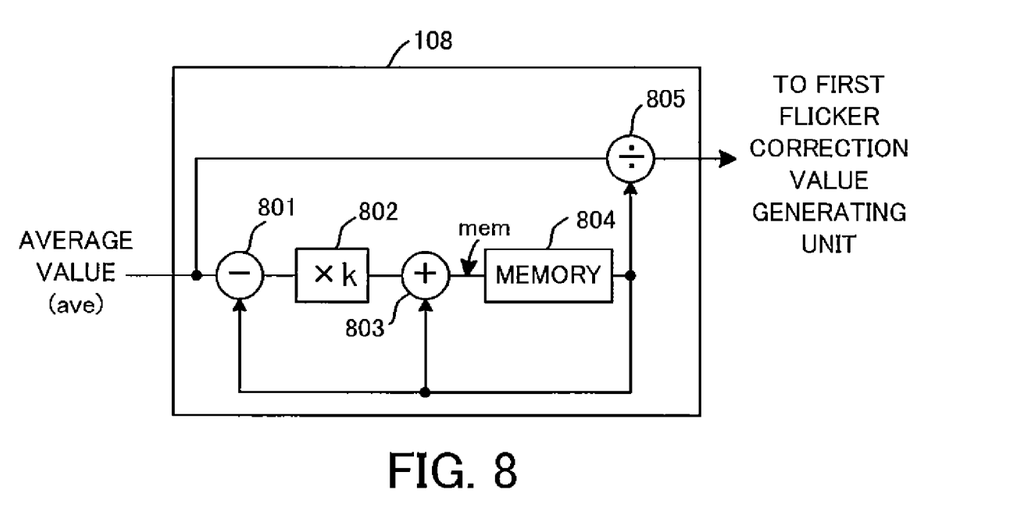
FIG. 8 is a block diagram of a flicker detecting unit in the present embodiment.

Next, referring to FIG. 8, an example of a method of calculating a flicker component of each detection frame by the flicker detecting unit 108 will be described. FIG. 8 is a block diagram of the flicker detecting unit 108. In FIG. 8, a subtracter 801, a multiplier 802, an accumulator 803, and a memory 804 performs the calculation using following Expression (2) to form a so-called cyclic low-pass filter.

$$mem = ave \times k + mout \times (1-k) \tag{2}$$

In Expression (2), symbol ave denotes an average value that is generated by the evaluation value generating unit 107. Symbol mout denotes an output from the memory 804. Symbol mem denotes an output of the accumulator 803, which is a value that is to be newly stored in the memory 804. Symbol k denotes a filter coefficient of the cyclic low-pass filter. A divider 805 calculates a luminance variation component that is caused by the light emitting period of the fluorescent material as a flicker component by dividing the average value ave by the output from the memory 804, and outputs the flicker component to a first flicker correction value generating unit 109.

The first flicker correction value generating unit 109 generates a flicker correction value (a first correction gain value) that is used to perform a flicker correction for the image pickup signal based on the variation information of the illumination intensity that is detected by the flicker detecting unit 108. Specifically, the first flicker correction value generating unit 109 obtains an inverse of a flicker component that is given by the flicker detecting unit 108 to generate the first correction gain value. The first correction gain value is multiplied by image pickup data by the multiplier 105 to perform the flicker correction. Thus, the multiplier 105 is a flicker correcting unit that performs the flicker correction for the image pickup signal based on the first correction gain value as a flicker correction value.

Subsequently, in order to generate vertical and lateral images that are used for the focus detection, data are distributed by a data distributing unit 112. The data distributing unit 112 distributes the data that are outputted to a vertical correlation calculating unit 114 and a lateral correlation calculating unit 113 (collectively, a correlation calculating unit). The vertical correlation calculating unit 114 and the lateral correlation calculating unit 113 perform a vertical correlation calculation (a correlation calculation in a first direction) and a lateral correlation calculation (a correlation calculation in a second direction), respectively, after the flicker correction is performed. These results are outputted to an AF detection system to be used to detect a focal state. Furthermore, as described below, the correlation calculation result in the vertical correlation calculating unit 114 is used for calculating the rest of the flicker correction (a remaining flicker).

Figure 2:
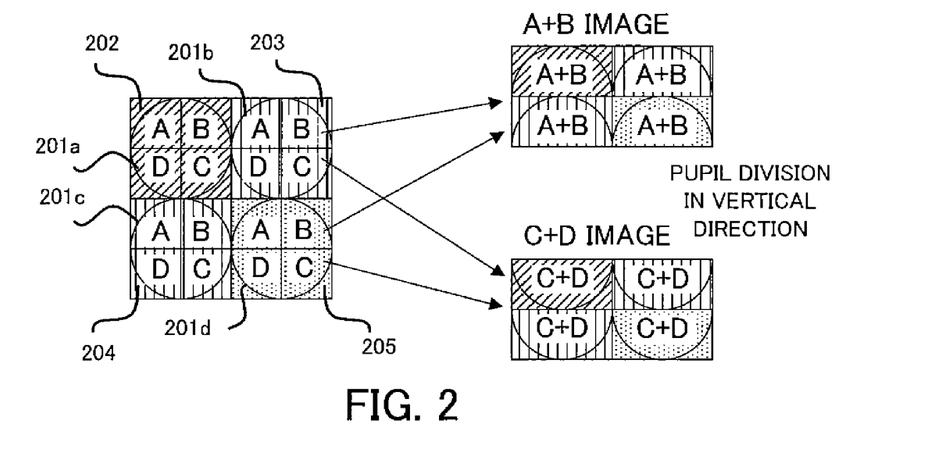
FIG. 2 is an arrangement diagram of pixels and micro lenses of an image pickup element in the present embodiment.

Next, referring to FIGS. 2, 3A, and 3B, a pixel arrangement of the image pickup element and images that are used for performing a pupil division in a vertical direction will be described. FIG. 2 is a diagram of arrangement of pixels and micro lenses in the image pickup element 101. The pixel arrangement of FIG. 2 illustrates one example of the image pickup element that includes a pixel that outputs a signal used for performing both the focus detection and the imaging. In FIG. 2, reference numeral 201a denotes a micro lens that is arranged in front of four pixels 202. Similarly, reference numerals 201b, 201c, and 201d are micro lenses that are arranged in front of four pixels 203, 204, and 205, respectively. The micro lenses 201a to 201d are designed to have such a shape that receives whole of light beam that passes through an emission pupil of a bright interchangeable lens (for example, F1.0). When the four pixels 202 are assigned to be A, B, C, and D areas as illustrated in FIG. 2 to perform the pupil division in the vertical direction, the image can be divided into an upper image and a lower image. In the present embodiment, the upper image that is obtained by the pupil division is referred to as an A+B image, and the lower image that is obtained by the pupil division is referred to as a C+D image. Similarly to the four pixels 202, each of the four pixels 203, 204, and 205 is divided into the upper image and the lower image by the pupil division. A R (red) color filter is arranged at the pixels 202, G (green) color filters are arranged at the pixels 203 and 204, and a B (blue) color filter is arranged at the pixels 205.

Figure 3A:
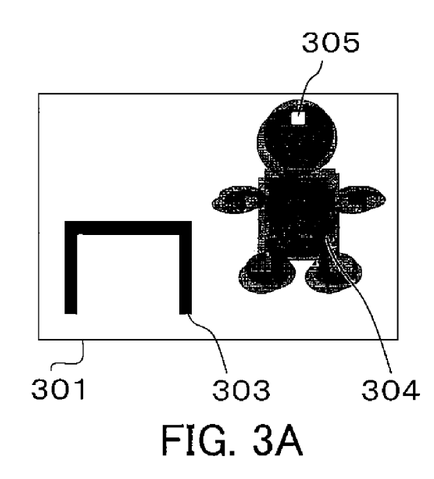
FIGS. 3A and 3B are diagrams of describing two images that are obtained when a pupil division is vertically performed in the present embodiment.
Figure 3B:
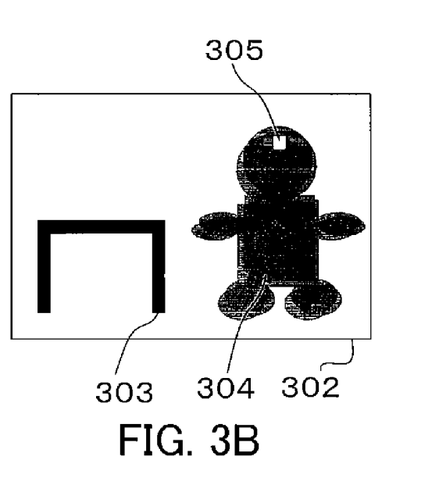

FIGS. 3A and 3B are diagrams of describing images that are obtained by performing the pupil division in the vertical direction, and FIG. 3A illustrates an A+B image 301 and FIG. 3B illustrates a C+D image 302. An image shift is not generated at a position 303 that is in an in-focus state. On the other hand, the image shift in a vertical direction is generated at a position 304 that is in an out-of-focus state since the pupil division is performed in the vertical direction. Reference numeral 305 denotes a part of pixels at the position in the out-of-focus state, and levels of a pixel 305 in the A+B image 301 and a pixel 305 in the C+D image 302 coincide with each other if the phenomenon such as a flicker is not generated. Specifically, a process of overlapping the two images to obtain a sum of an absolute value of the level difference is performed while shifting the overlapped positions of the two images, and a position where the absolute value of the level difference is minimized is obtained. A difference value of the level of a target pixel (the pixel 305) that is obtained by the process is determined as a rest of the flicker correction.

Figure 6:
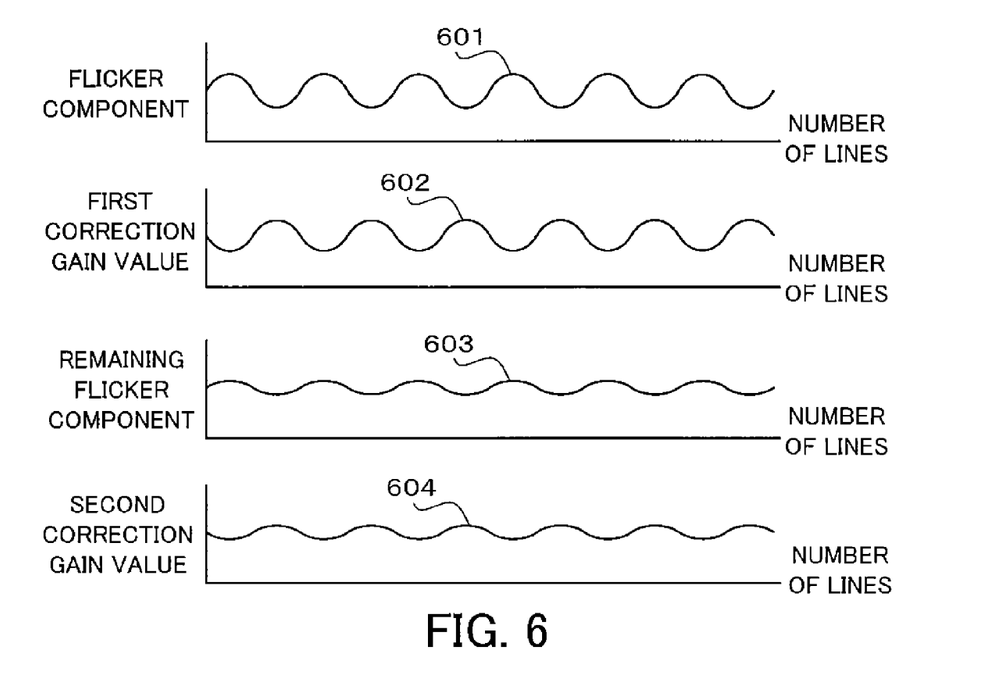
FIG. 6 is a diagram of a relationship between a flicker component and a correction gain value in the present embodiment.

FIG. 6 is a diagram of a relationship between the flicker component and the correction gain value. In FIG. 6, a lateral axis indicates the number of lines, and a vertical axis indicates an intensity of the flicker component or a level of the correction gain value. Reference numeral 601 denotes a flicker component that is contained before performing the flicker correction using the flicker circuit 104 in FIG. 1, i.e. a flicker component that is contained in the original image pickup data. Reference numeral 602 denotes a correction gain value (a first correction gain value) that is calculated by the flicker circuit 104 (the first flicker correction value generating unit 109). The flicker circuit 104 removes the flicker component 601 using the correction gain value 602. Specifically, the flicker component 601 is multiplied by the correction gain value 602 by the multiplier 105 in FIG. 1 to correct the flicker that is contained in the image pickup data. Actually, however, it is difficult to perform exact flicker detection because of the motion of an object or the like, and therefore the rest of the flicker correction (the remaining flicker component) exists. Reference numeral 603 in FIG. 6 denotes the remaining flicker component. Reference numeral 604 denotes a correction gain value (a second gain value) that is calculated by a second flicker correction value generating unit 110 described below. The remaining flicker component 603 is multiplied by the correction gain value 604 by the multiplier 111 in FIG. 1 to be able to improve the accuracy of the flicker correction.

Hereinafter, operations of a remaining flicker detecting unit 115 and a second flicker correction value generating unit 110 illustrated in FIG. 1 will be described. The remaining flicker detecting unit 115 is a flicker detecting unit that detects the remaining flicker based on a result of the vertical correlation calculation. The second flicker correction value generating unit 110 is a flicker correction value generating unit that generates a second flicker correction value to perform a second flicker correction for the image pickup signal based on the remaining flicker and the first correction gain value (the flicker correction value).

The pixels 305 in FIGS. 3A and 3B are set to be target pixels, and a pixel value of the pixel 305 in the A+B image 301 of FIG. 3A is assumed to be 990 and a pixel value of the pixel 305 in the C+D image 302 of FIG. 3B is assumed to be 1000. In this case, the absolute value of the difference between the two pixel values is 10. The correction gain value that is obtained by the multiplication of the first flicker correction by the multiplier 105 with reference to the target pixel (the pixel 305) of the A+B image 301 is assumed to be 500 at the target pixel (the pixel 305) of the A+B image 301. In this case, a center value of the first correction gain value (a reference value) is assumed to be 512. In order to make the pixel fit the reference of the target pixel (the pixel 305) of the A+B image 301, an ideal pixel value of the C+D image 302 after the second flicker correction is performed by the multiplier 111 is 990.

In performing the correction detection of the remaining flicker by the remaining flicker detecting unit 115, an expression of calculating an additional correction gain value for the target pixel (the pixel 305) of the C+D image 302 is represented as following Expression (3).

$$1000 \times \alpha / 512 = 990 \quad (3)$$

In Expression (3), α is an additional correction gain value for the target pixel (the pixel 305) of the C+D image 302, and is obtained as following Expression (4).

$$\alpha = (990 \times 512)/1000 \approx 507 \quad (4)$$

Thus, the additional correction gain value for the target pixel (the pixel 305) of the C+D image 302 is 507. The second flicker correction value generating unit 110 calculates a second correction gain value using the additional correction gain value and the first correction gain value obtained by the multiplication of the first flicker correction.

An expression of calculating the second correction gain value in the second flicker correction value generating unit 110 is represented as following Expression (5).

$$(512-500)/512:(512-507)/512=(512-\beta)/512:(512-\gamma)/512 \quad (5)$$

In Expression (5), β is a first correction gain value that is multiplied by the A+B image 301, and γ is an additional correction gain value that is to be multiplied by the C+D image 302. When the above expression is simplified, it can be represented as following Expression (6).

$$12:5=(512-\beta):(512-\gamma) \quad (6)$$

The second flicker correction value generating unit 110 calculates the additional correction gain value γ that is to be multiplied by each line of the C+D image 302. The multiplier 111 performs an additional flicker correction (a second flicker correction) using the calculated additional correction gain value (a second correction gain value). Thus, the multiplier 111 (a second flicker correcting unit) is a flicker correction unit that performs the second flicker correction for the image pickup signal based on the second flicker correction value. An output of the multiplier 111 (development system data) is inputted to a pixel adding unit 116. The pixel adding unit 116 performs a pixel addition of the development system data to obtain the Bayer array and outputs the Bayer array data to a development system.

Figure 5:
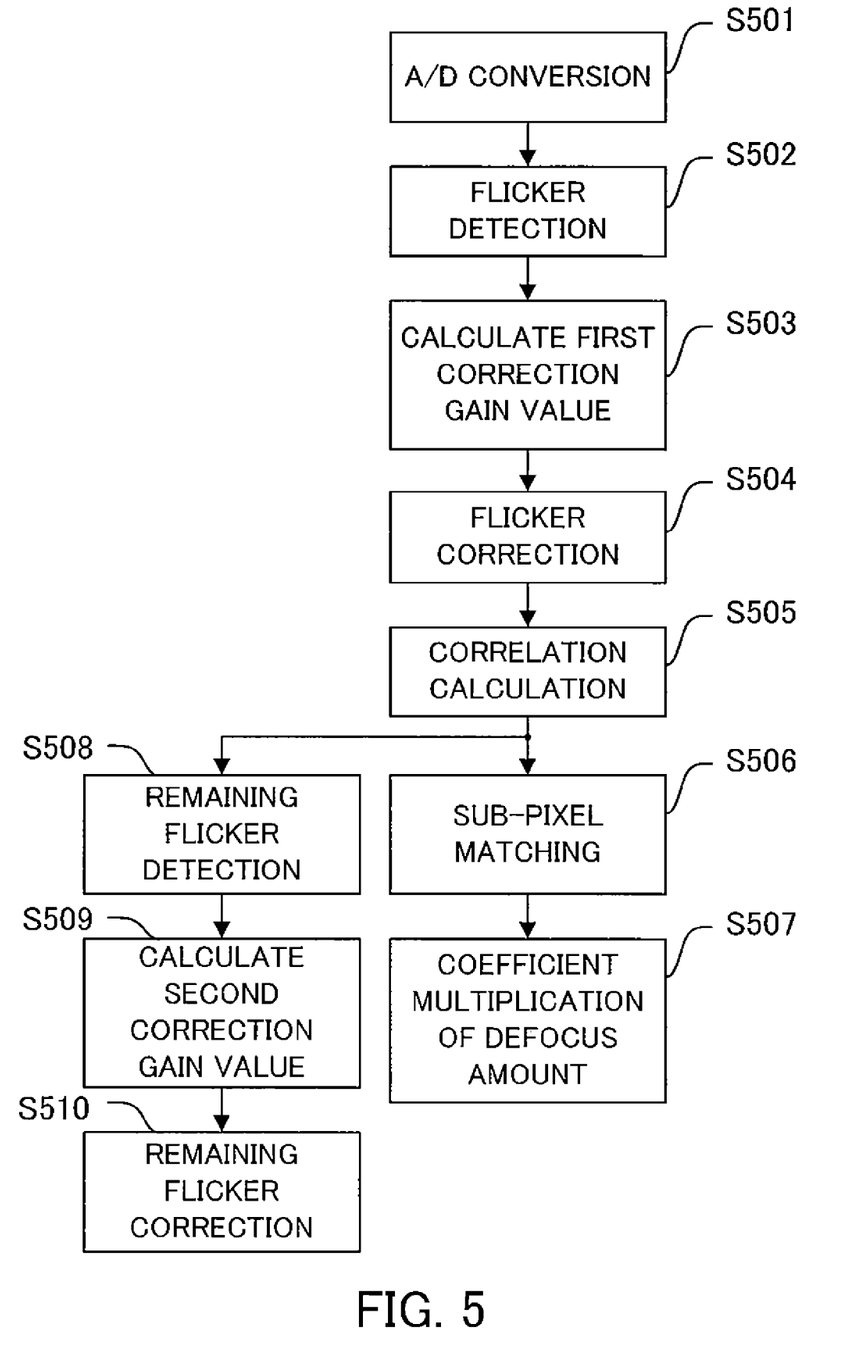
FIG. 5 is a flow chart of a flicker correcting method in the present embodiment.

Next, a flicker correcting method that is performed by the image pickup apparatus of the present embodiment (a procedure of the flicker correction, the defocus amount calculation, and the additional flicker correction) will be described. FIG. 5 is a flow chart of the flicker correcting method. For example, each step in FIG. 5 is performed by an instruction of a controller based on a program that is stored in the image pickup apparatus.

First of all, in Step S501, the A/D converter 103 performs analog-to-digital conversion for a signal obtained from the image pickup element 101 (an image pickup electric signal) to convert this image pickup electric signal into a digital image signal. Subsequently, in Step S502, the flicker detecting unit 108 performs flicker detection, and in Step S503, the first flicker correction value generating unit 109 calculates the first correction gain value. Then, in Step S504, the multiplier 105 performs the flicker correction using the first correction gain value for the image pickup data that is an output of the A/D converter 103.

Next, in Step S505, the correlation calculating unit (the lateral correlation calculating unit 113 and the vertical correlation calculating unit 114) performs a correlation calculation for the image pickup data for which the flicker correction has been performed. Specifically, a process in which two images obtained by pupil division are overlapped to obtain a sum of an absolute value of the level difference is performed while shifting the overlapped positions of the two images, and a position where the absolute value of the level difference is minimized is obtained. These processes are performed both in lateral and vertical directions.

Then, in Step S506, a sub-pixel matching is performed using a parabola fitting method based on values around positions where the absolute value of the level difference is reduced using the correlation calculation result calculated in Step S505. According to this process, the accuracy of an image shift amount can be improved. Subsequently, in Step S508, a predetermined coefficient that is determined by a base-line length is multiplied by the image shift amount to obtain a defocus amount.

On the other hand, in Step S508, the remaining flicker detecting unit 115 performs the remaining flicker detection for the target pixel. The remaining flicker detection is performed using characteristics of the flicker of the fluorescent light that generates luminance unevenness in a vertical direction, based on the result of the vertical correlation calculation that is calculated in Step S505. Subsequently, in Step S509, the second flicker correction value generating unit 110 calculates a second correction gain value for correcting the remaining flicker using the remaining flicker detected in Step S508 and the first correction gain value calculated in Step S503. Then, in Step S510, the multiplier 111 performs the remaining flicker correction for the image pickup data for which the flicker correction has been performed (the output of the multiplier 105) using the second correction gain value calculated in Step S509.

Thus, the image pickup apparatus of the present embodiment includes the image pickup element that has a pixel that functions as both the focus detection pixel and the imaging pixel to perform the vertical correlation calculation after the flicker correction. Then, the target pixels of the two images obtained by the pupil division are compared to detect the rest of the flicker correction or the excessive correction to perform the additional flicker correction. According to the present embodiment, an image pickup apparatus capable of performing a flicker correction with high accuracy can be provided.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-285388, filed on Dec. 22, 2010, which is hereby incorporated by reference herein in its entirety.

What is claimed is:

1. An image pickup apparatus comprising:
   an imaging unit including a plurality of imaging pixels disposed on a plurality of lines, the imaging pixels performing a photoelectrical conversion at an exposure timing different between each line;
   a flicker detecting unit configured to detect variation information of illumination intensity based on an image signal obtained from the imaging unit;
   a flicker correction value generating unit configured to generate a flicker correction value for performing a flicker correction for an image signal obtained from the imaging unit based on the variation information of the illumination intensity;
   a flicker correcting unit configured to perform the flicker correction for a pair of image signals that are obtained from the imaging unit by performing a photo electrical conversion for a pair of light beams obtained by performing a pupil division in a direction different from the line, based on the flicker correction value; and a correlation calculating unit configured to perform a correlation calculation using the pair of image signals for which the flicker correction has been performed in the flicker correcting unit.

2. The image pickup apparatus according to claim 1, an evaluation value generating unit configured to generate an evaluation value of an image signal obtained from the imaging unit;

wherein the evaluation value generating unit generates the evaluation value that represents a level of the image pickup signal obtained from the imaging unit by dividing the image signal into a plurality of areas to perform normalization in each area of the plurality of areas, wherein the flicker detecting unit detects the variation information of illumination intesity based on the evaluation value.

3. The image pickup apparatus according to claim 1, further comprising:

a remaining flicker detecting unit configured to detect a remaining flicker based on a result of the correlation calculation;

a second flicker correction value generating unit configured to generate a second flicker correction value for performing a second flicker correction for the image signal obtained from the imaging unit based on the remaining flicker and the flicker correction value; and a second flicker correcting unit configured to perform the second flicker correction for the image signal obtained from the imaging unit based on the second flicker correction value.

4. An image pickup apparatus comprising:

an imaging unit including a plurality of imaging pixels disposed on a plurality of lines, the imaging pixels performing a photoelectrical conversion at an exposure timing different between each line;

a correlation calculating unit configured to perform a correlation calculation using a pair of image signals that are obtained from the imaging unit by performing a photo electrical conversion for a pair of light beams obtained by performing a pupil division in a direction different from the line;

a flicker detecting unit configured to detect variation information of illumination intensity based on a result of the correlation calculation;

a flicker correction value generating unit configured to generate a flicker correction value for performing a flicker correction for an image signal obtained from the imaging unit based on the variation information of the illumination intensity; and a flicker correcting unit configured to perform the flicker correction for an image signal obtained from the imaging unit based on the flicker correction value.

5. A control method for an image pickup apparatus having an imaging unit including a plurality of imaging pixels disposed on a plurality of lines, the imaging pixels performing a photoelectrical conversion at an exposure timing different between each lines, the method comprising:

detecting variation information of illumination intensity based on an image signal obtained from the imaging unit;

generating a flicker correction value for performing a flicker correction for an image signal obtained from the imaging unit based on the variation information of the illumination intensity;

performing the flicker correction for a pair of image signals that are obtained from the imaging unit by performing a photoelectrical conversion for a pair of light beams obtained by performing a pupil division in a direction different from the line, based on the flicker correction value; and performing a correlation calculation using the pair of image signals for which the flicker correction has been performed.

6. A control method for an image pickup apparatus having an imaging unit including a plurality of imaging pixels disposed on a plurality of lines, the imaging pixels performing a photoelectrical conversion at an exposure timing different between each lines, the method comprising:

performing a correlation calculation using a pair of image signals that are obtained from the imaging unit by performing a photoelectrical conversion for a pair of light beams obtained by performing a pupil division in a direction different from the line;

detecting variation information of illumination intensity based on a result of the correlation calculation;

generating a flicker correction value for performing a flicker correction for an image signal obtained from the imaging unit based on the variation information of the illumination intensity; and performing the flicker correction for an image signal obtained from the imaging unit based on the flicker correction value.

* * * * *